Figure 1:
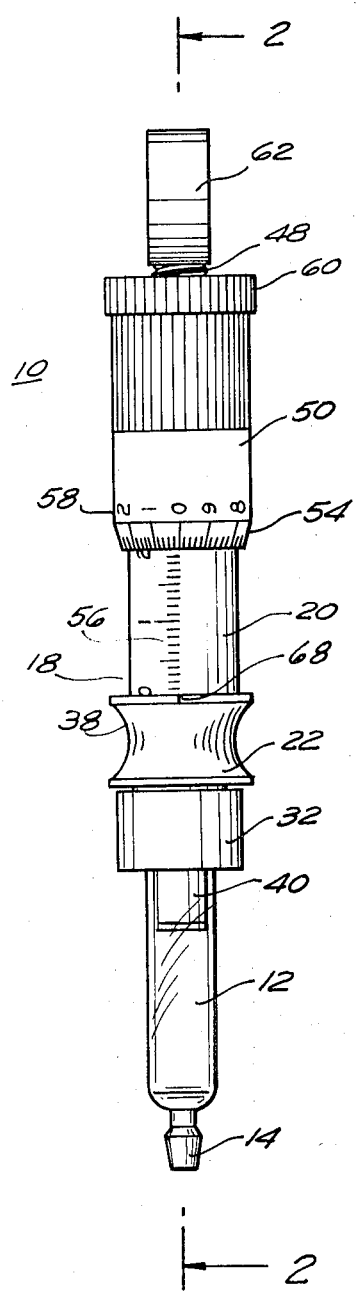

United States Patent [19]
Gilmont

[11] 3,815,785
[45] June 11, 1974

[54] MICROMETRIC DISPENSER WITH CALIBRATION MEANS

[75] Inventor: Roger Gilmont, Douglaston, N.Y.

[73] Assignee: Roger Gilmont Instruments Inc., Great Neck, N.Y.

[22] Filed: Dec. 4, 1972

[21] Appl. No.: 311,926

[52] U.S. Cl.............................. 222/46, 128/218 C
[51] Int. Cl.............................................. A61m 3/00
[58] Field of Search.......... 222/309, 46; 128/218 R, 128/218 C, 218 P

[56] References Cited
UNITED STATES PATENTS

| | | | |
|---|---|---|---|
| 3,162,217 | 12/1964 | Poli, Jr. et al................ | 128/218 C X |
| 3,232,117 | 2/1966 | Gilmont......................... | 128/218 C |
| 3,430,813 | 3/1969 | Gilmont......................... | 222/309 X |

Primary Examiner—Stanley H. Tollberg

[57] ABSTRACT

A pump-type dispenser in which the degree of movement of the piston, and hence the volume of liquid dispensed on each cycle of operation is adjustably controlled by a structure mounted on the piston rod. The dispenser is provided with means for adjusting the zero setting of the calibrated indicia.

17 Claims, 2 Drawing Figures

PATENTED JUN 11 1974

3,815,785

MICROMETRIC DISPENSER WITH CALIBRATION MEANS

The present invention relates to a micrometric dispenser designed to produce repetitive delivery of liquids in accurately controlled amounts, with means being provided for precisely varying the amount of liquid to be dispensed and for adjusting the zero reading of the calibrated indicia.

It often occurs, both in production installations and in laboratories, that rapid repetitive dispensing of a predetermined amount of liquid is required, with the precise amount needed varying from time to time. Dispensing devices capable of accomplishing these results are available, but they are in general complicated, expensive, and in many instances constituted by heavy, relatively fixed pieces of equipment.

I have previously developed a dispensing device which is a vast improvement over the prior art devices as to simplicity, accuracy and controlled adjustability of the amount of liquid dispensed, the device being disclosed in U.S. Pat. No. 3,430,813, issued Mar. 4, 1969. The device is constituted by a pump structure comprising a cylinder and a piston. A piston rod is provided which extends from the cylinder through a wall at the operating end of the cylinder for actuation to cause the piston to sealingly slide within the cylinder. The piston rod has stop means which limit the movement of the piston within the cylinder and, correspondingly, the amount of fluid delivered by the device. At least one of the stop means is adjustably positioned on the piston rod to vary the volume of liquid dispensed. The adjustable stop means is constructed in micrometer-like fashion and is defined by a sleeve threadedly engaged with the piston rod. The indicia which cooperate to indicate the precise amount of piston movement within the cylinder are located on the sleeve and on the piston rod.

Further study of this dispenser has revealed that the zero setting of the calibrated indicia is dependent upon the precision of the manufacturing operation in positioning the sleeve on the piston rod and in embossing the appropriate indicia on the piston rod. Thus, when the adjustable sleeve is in contact with the end wall of the cylinder, the piston should exhibit no longitudinal movement and the zero lines on the respective indicia should be aligned, this set of conditions being defined as the "zero position." If such alignment is not achieved, the volume of liquid to be dispensed is not as indicated by the indicia. With my prior dispenser, however, it is not possible to adjust a discrepancy in the zero reading. Thus, if an adjustment attempt was made by rotating the sleeve independent of the rod, the movement of the sleeve away from the end wall would free the piston to exhibit longitudinal movement. If, on the other hand, the sleeve and piston rod were rotated as a unit in order to achieve alignment without permitting longitudinal movement, the set of indicia present on the rod would necessarily move in conjunction with the indicia on the sleeve, thereby maintaining the margin of inaccuracy. While my prior art dispenser is a vast improvement over the prior art, in respect to simplicity and accuracy of delivery it is seen that any deviation in the zero position irrevocably nullifies its effectiveness.

It is the prime object of this invention to provide an improved micrometric dispenser which contains means for adjusting the zero position of the calibrated indicia so as to insure the delivery of accurate predetermined amounts of liquid.

It is a further object to provide a simple, reliable, inexpensive construction wherein the amount of liquid to be dispensed can be accurately and readily varied.

It is still a further object to accomplish these results by a construction capable of portability rather than by a fixed piece of equipment.

Another object of this invention is to provide a device which may be readily disassembled and cleaned.

In general, the dispenser of this invention is constituted by a light, simple pump structure comprising a cylinder and a piston. A piston rod extends from the cylinder for actuation to cause the piston to sealingly slide within the cylinder, that piston rod passing through a body member fixedly secured to the cylinder at the operating end thereof. In accordance with the present invention the piston rod is provided with first and second stop means located respectively inside and outside the cylinder and engageable with said cylinder so as to limit the degree to which the piston rod can be slid into and out from the cylinder, thus correspondingly limiting the degree of movement of the piston within the cylinder and hence the amount of fluid delivered by the device upon each cycle of reciprocation of the piston. At least one of these stop means is adjustably positioned along the length of the piston rod thereby to permit adjustment of the piston movement and hence of the volume of fluid dispensed on each cycle of operation. In order to provide for exceedingly precise control of the location of the adjustable stop means relative to the piston rod it is preferably constructed in micrometer-like fashion, the stop means being defined by a sleeve extending along the piston rod threadedly engaged with the piston rod at a point remote from the cylinder. The body member and the end of the sleeve directed toward the cylinder having cooperating indicia thereon to indicate the precise amount of axial movement permitted to the piston within the cylinder. Since the lateral dimensions of the cylinder are known, these indicia may be directly calibrated in terms of the volume to be dispensed.

More importantly, the improved aspects of the present invention are achieved by providing the micrometric dispenser with means for adjusting its zero position, i.e., aligning the zero reading of the calibrated indicia which are present to indicate the volume of liquid to be dispensed. Such zero reading adjustment is provided by the micrometer-like assembly which comprises the stop means defined by the sleeve extending along a piston rod and threadedly engaged thereto, the fixedly secured body member having a flange thereon, and cooperating indicia present on said sleeve and said body member. In contrast to my prior dispenser wherein the cooperating indicia were embossed onto the sleeve and the piston rod and it was thus not possible to adjust the zero reading since rotation of the sleeve relative to the indicia on the rod caused displacement of the piston from its zero volume delivery position, the instant construction removes the indicia from the rod and places them instead on a fixedly secured, independent body member. Accordingly, rotation of the sleeve relative to the body member permits alignment of the zero lines without moving the piston from its zero volume delivery position and without corresponding movement of the indicia. More specifically, the piston, piston rod and sleeve function as a single unit when rotated around the fixed body member in order to align the zero reading of the respective indicia. Since there is no movement of the sleeve relative to the piston rod, the zero delivery position is maintained. Also, since there is no movement of the body member, the sleeve can be rotated until the zero lines are aligned. In this manner, the dispenser can be calibrated periodically and the practitioner can be certain that the desired and indicated volume of liquid is actually being dispensed. Such zero position adjustment also substantially increases the useful life of the dispenser and allows for elimination of much of the critical dimensioning during the manufacture of the dispenser.

In addition, since the device may be used with liquids which tend to foul the cylinder and piston, or with a series of different reagents under circumstances where purity is important, it is desirable that the dispenser be readily disassembled for cleaning purposes. This is very easily accomplished with the device of the present invention, particularly in the form here specifically disclosed, where the body member through which the piston rod slides is readily removable from the cylinder, along with the piston and piston rod, this removal being accomplished merely by unscrewing a retaining element and lifting the unit out from the open operating end of the cylinder. The cylinder and cylinder tip are formed of a single piece of glass, while the piston rod, the body member, the piston and appurtenances may well be formed of appropriate corrosion-resistant plastic materials which may readily be cleaned with conventional liquid cleaning agents.

The device may be actuated either manually or automatically but a feature of its construction is that it is capable of one-hand operation, thus leaving the other hand of the operator free to direct the output from the device to precisely the desired place and making the device exceedingly suitable for use in laboratory or production installations where an accurately predetermined amount of reagent is to be supplied in rapid succession to a plurality of containers such as test tubes.

Figure 2:
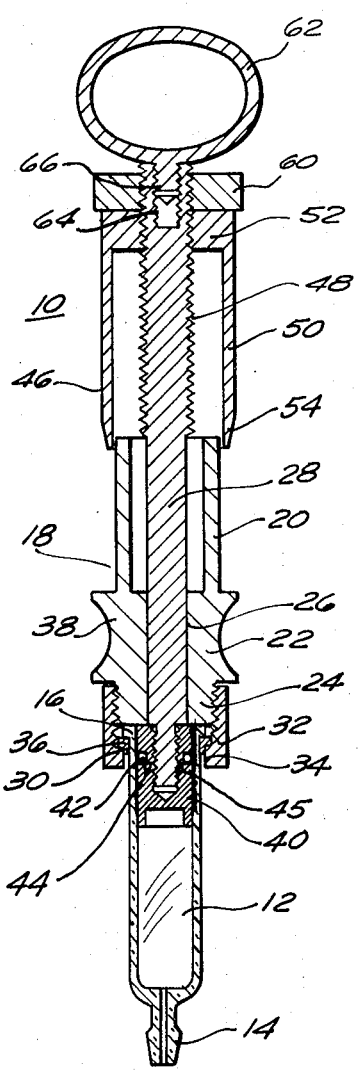

To the accomplishment of the above, and to such other objects as may hereinafter appear, the present invention relates to the construction of an adjustable volume dispenser as defined in the appended claims and as described in this specification taken together with the accompanying drawings, in which:

FIG. 1 is an elevational view of a preferred embodiment of the micrometric dispenser of this invention; and FIG. 2 is a cross-sectional view of the dispenser taken through line 2—2 of FIG. 1.

The dispensing device 10 depicted in FIGS. 1 and 2 comprises a cylinder 12 which functions as a temporary reservoir for the liquid. Cylinder 12 terminates in tip 14 which may define a Luer joint for direct filling and dispensing, a multi-channelled stopcock (not shown) for repetitive dispensing from a reagent reservoir, and the like. In turn, tip 14 may be connected to a hypodermic needle, flexible tubing, and the like to facilitate fluid intake and output.

The upper end of cylinder 12 is open and is provided with a radially outwardly extending rim 16. Body member 18 which comprises an upper indicia-carrying part 20, a central flange section 22, and a lower externally threaded section 24 is adapted to rest upon the upper, open end of cylinder 12, the undersurface of threaded section 24 contacting the open end and thereby closing same. Body member 18 has a longitudinal central opening 26 through which a piston rod 28 is freely slidable. Cylinder 12 and body member 18 are fixedly secured by means of a slit ring 30 which engages the underside of cylinder rim 16, and nut 32 which has a radially inwardly extending rim 34 adapted to engage the outwardly extending flange 36 of ring 30 and a threaded internal surface adapted to be threadedly engaged with the externally threaded surface of section 24. The outer surface of flange section 22 is made concave, at 38, so that it may more readily be grasped by the fingers of the user.

Attached to that end of the piston rod 28 which extends down below member 18 and into the cylinder 12 is a piston 40 which sealingly slidably engages the inner surface of the cylinder 12. Since the cylinder 12 is preferably formed of precision bore glass tubing and the cylinder-engaging surface of the piston 40 is preferably precision machined, slidability of the piston 40 within the cylinder 12 without leakage of liquid between the piston and cylinder is reliably assured. The optional presence of sealing ring 42 in recess 44 on the surface of piston 40 provides further protection against leakage. With regard to piston 40, it may be a one-piece construction which is secured to the lower end of piston rod 28 in any appropriate fashion, as by providing piston 40 with an axial internally threaded passage into which an externally threaded projection from piston rod 28 is adapted to be threadedly received. Likewise, piston 40 may be a two-piece construction (as shown) in FIG. 2) wherein the recess 44 for receiving sealing ring 42 is at the juncture 45 of the two component pieces so that the threaded engagement of the pieces serves to hold the ring in fixed position. The piston 40 is, of course, larger than the opening 26 in member 18, the upper surface of the piston 40 thus defining a positive stop means engageable with the undersurface of threaded section 24 so as to limit the degree to which the piston rod 28 and the piston 40 may move upwardly.

A second positive stop means, generally designated 46, is mounted on that portion of the piston rod 28 which extends above member 18 and out of the cylinder 12, thereby to limit the degree to which the piston 28 and the piston 40 may be moved downwardly. Stop means 46 is adjustably mounted on the piston rod 28 so as to be positionable at different points along the length of the latter, thereby to vary the permissible extent of reciprocation of the piston rod 28 and piston 40, in this way adjustably controlling the volume of liquid to be dispensed on each cycle of actuation of the device. In the form here specifically disclosed, which has been found to give extremely accurate control of piston movement by means of simple structure, the outer surface of the upper portion of the piston rod 28 is externally threaded, at 48. A sleeve 50 extends around said upper portion of the piston rod 28, has an upper inwardly extending portion 52 which threadedly engages the piston rod threads 48, and has a tip 54 which extends down from the part 52 and is adapted to engage flange 22 when the piston rod 28 is moved downwardly. As may best be seen from FIG. 1, longitudinally extending indicia 56 are provided on the outer surface of part 20, with its zero line coinciding with the upper surface of flange 22, and cooperating circumferentially extending indicia 58 are provided adjacent the sleeve tip 54, the indicia 56 and 58 cooperating in well-known micrometer-like fashion accurately to indicate the location of the sleeve 50 along the piston rod 28. Since that location determines the degree to which the piston 40 may be moved within the cylinder 12, and hence the volume of liquid dispensed on each reciprocation of the piston 40 through that range of movement, the graduations 56 and 58 may be calibrated directly in terms of the volume of liquid to be dispensed.

Once the sleeve 50 defining the adjustable stop 46 has been positioned along the piston rod 28 at a point corresponding to the desired volume of liquid to be dispensed, it may be locked in that position by means of a lock nut 60 threadedly received on the externally threaded surface 48 of the piston rod 28 and adapted to be screwed down onto the upper surface of the sleeve 50. Correspondingly, the threaded engagement of sleeve 50 on rod 28 may be so designed as to provide an in-situ locking mechanism.

To facilitate movement of the piston rod 28 up and down a ring 62 or other handle may be secured thereto in any appropriate fashion, as by providing the piston rod 28 with an axial internally threaded passage 64 into which an externally threaded projection 66 from the handle 62 is adapted to be threadedly received.

The filling, zero position calibration and volume setting operations required to prepare the device for dispensing are preferably conducted as a continuous operation. Thus, the device is filled in the same manner as a conventional syringe, with sleeve 50 being set for maximum volume delivery, i.e., sleeve 50 is positioned at the top os of rod 28. Tip 14 of cylinder 12 is generally fitted with a hypodermic needle in order to facilitate liquid intake. Thereafter, piston rod 28 is lowered until tip 54 of sleeve 50 engages flange 22, in which position piston 40 will be in its lowermost position in cylinder 12. The needle is inserted into the liquid and piston 40 is partially raised in order to draw liquid into part of cylinder 12. The unit is inverted until the air bubble, resulting from the unfilled section of cylinder 12, is moved into the upper part of cylinder 12 whereupon piston 40 is moved back into cylinder 12 until the air bubble is expelled. It is necessary to remove air from the liquid delivery system, since the presence of a compressible medium will adversely effect the accuracy and reproducibility of the amount of liquid dispensed. Tip 14 is reintroduced into the liquid and piston 40 moved to its uppermost position in contact with the underside of threaded section 24, thereby completely filling cylinder 12. It should be noted that a comparable filling operation may be adopted when a stopcock is used in lieu of the Luer joint.

Adjustment of the zero position is then accomplished by lowering sleeve 50 until tip 54 thereof contacts flange 22. Lock nut 60 is screwed down in similar manner onto the upper surface of sleeve 50 and is firmly locked in place. In this position, longitudinal movement is completely prevented and piston 40, piston rod 28 and sleeve 50 are combined as a single unit which can only engage in rotational movement and wherein the individual components are not free to move independently of the other parts. This three-component unit is then rotated until the zero line on sleeve tip 54 coincides with the corresponding zero line on the calibrated section 20 of member 18. Ready identification of the zero line on section 20 is facilitated by the presence of a corresponding zero line notation 68 on the circumferential surface of flange 22. Such zero reading adjustment is feasible since the combination of of sleeve 50 and rod 28 can be rotatively moved without effecting a corresponding movement of calibrated section 20. At this point, the alignment of the corresponding zero lines combined with the absence of any possible longitudinal movement by piston 40 is clearly indicative of an accurate zero position.

As has been indicated above, the precise amount of liquid delivered during each cycle of operation of the piston 40 from its lowermost position to its uppermost position and back again to its lowermost position is determined by the setting of the sleeve 50 relative to the piston rod 28, and that setting, in terms of desired volume of liquid to be dispensed in each cycle of operation, is indicated by the calibrated indicia 56 and 58. The desired setting is obtained by unscrewing lock nut 60, unscrewing sleeve 50 until it reaches the reading which corresponds to the desired volume, and then tightening lock nut 60 against the upper surface of sleeve 50 so as to lock sleeve 50 in the desired position. It is essential, however, that such sleeve movement be effected without disturbing the rotational position of piston rod 28, since any rotation of rod 28 will alter the adjusted zero position. In a preferred form each division of the indicia 56 on the calibrated section 20 may represent 0.1 ml. of liquid and each division of the indicia 58 on the sleeve 50 may represent 0.002 ml. so that by interpolation the volume setting can easily be made to an accuracy of 0.001 ml. The absolute accuracy of the volume dispensed will be better than 0.2 percent or 0.002 ml., whichever is the greater, and with reasonably careful technique reproducibility to 0.1 percent or 0.001 ml. can be achieved.

One-hand dispensing is readily accomplished by placing the thumb in the ring 62 and grasping the concave surface 38 of the flange 22 between forefinger and middle finger. This leaves the other hand of the operator free to direct the tip 14 to the precise point where liquid delivery is desired, and to manipulate the receiving vessel.

Cleaning of the dispensing device is exceedingly readily accomplished. By screwing the nut 32 downwardly off threaded section 24, member 18 is released and it may be lifted from the cylinder 12, carrying with it the piston 40 and the piston rod 28. This exposes the interior of the cylinder 12 and its associated glass parts to cleaning in conventional fashion. Member 18, the piston rod 28 and the sleeve 50 may be formed of corrosion-resistant polypropylene which can be accurately machined and which can also be subjected to autoclave purifying conditions without damage and which may be cleaned with detergent solutions. The Teflon piston 40 will resist the strongest of cleaning agents.

During normal operation of the device the liquid being dispensed will contact only glass or Teflon, and hence the possibility of reagent contamination and dispenser corrosion are minimized.

It should be noted that the dispensing device of this invention may be modified by incorporating features of the dispenser system disclosed in U.S. Pat. No. 3,430,813. For example, the cylinder may be secured to the body member by providing the body member with a depending flange which extends around and past the cylinder rim and which is internally threaded. A slotted nut with an external threaded surface thereafter engages the internal threaded surface of the flange in order to secure the two component parts. Likewise, the dispensing device may be combined with the check valve system described in the patent in order to control liquid flow into and out of the cylinder. Furthermore, the device may be provided with a tapered mounting in the form of a bottle stopper in order to permit its use with the bottle arrangement described in the patent.

In summary, it will be appreciated that the instant dispensing device represents a significant improvement over my prior construction insofar as it contains means for adjusting the zero position of the delivery system, thereby insuring delivery of the desired liquid volume, prolonging the useful life of the device and eliminating the need for substantial critical dimensioning during the manufacturing process. In common with the prior device, the instant dispenser represents virtually the utmost in simplicity while providing for high accuracy and carefully controlled adjustability of the amount of liquid dispensed, the device being settable to dispense a desired volume of liquid and thereafter being actuatable a virtually unlimited number of times in order to dispense each time precisely the desired volume of liquid. Changes in the amount of liquid to be dispensed may be easily, rapidly and accurately made. The dispensing device is easily cleaned, light, durable, and capable of use even for the dispensing of highly corrosive reagents. It may be used with or without reagent bottles and may be carried and manipulated by one hand if desired. Its accuracy combined with its adaptability and inexpensiveness make it suitable for use in a wide range of environments, from small laboratories and experimental operations to factories and production operations.

While but a single embodiment of the present invention has been here specifically disclosed, it will be apparent that many variations may be made in the details thereof, all within the spirit of the invention as defined in the following claims.

I claim:

1. A micrometric dispenser comprising a cylinder having an open end for liquid intake and delivery and an opposite open operating end, a flanged member detachably secured in place and closing said operating end, said flanged member having an opening therethrough and comprising an indicia carrying part, a piston rod slidable through said opening, a piston carried by said piston rod and sealingly slidable along the inside of said cylinder, first stop means on said piston rod effective to limit the degree to which said piston rod can be slid out from said cylinder, second stop means on said piston rod outside said cylinder effective to circumferentially rotate about said indicia carrying part of said flanged member and engage said flange on said flanged member to limit the degree to which said piston rod can slide into said cylinder, said stop means being adjustably positionable along the length of said piston rod, thereby to adjustably vary the degree to which said piston rod may be reciprocated relative to said cylinder, and cooperating indicia present, respectively, on said indicia carrying part of said flanged member and said second stop means calibrated to indicate the degree of reciprocal motion permitted said piston rod, a reference line on the indicia carried by said flanged member extending on said flanged member to a point outside said second stop means when said second stop means engages said flange on said flanged member whereby said reference line and the indicia carried by said second stop means cooperate to define the zero starting point of said dispenser.

2. The dispenser of claim 1, wherein said piston rod has a threaded outer surface and said second stop means is threadedly engaged with said surface thereby being rotatable on said piston rod to produce said adjustability along said rod.

3. The dispenser of claim 2, wherein said second stop means comprises a sleeve part received around said piston rod and extending toward said cylinder.

4. The dispenser of claim 2, wherein a lock nut is threadedly mounted on said piston rod and screwable into engagement with said second stop means, thereby to lock the latter in adjusted position on said rod.

5. The dispenser of claim 3, wherein a lock nut is threadedly mounted on said piston rod and screwable into engagement with the upper surface of said sleeve part, thereby to lock the latter in adjusted position on said rod.

6. The dispenser of claim 1 wherein said flanged member comprises an operating end engaging part, said operating end engaging part separated from said indicia carrying part by said flange.

7. The dispenser of claim 6 wherein said operating end engaging part has an externally threaded portion, the upper surface of said externally threaded portion being received on said open operating end of said cylinder.

8. The dispenser of claim 1, wherein said flange has a concave radially outer surface defining a finger-engaging area.

9. The dispenser of claim 7, wherein said flange has a concave radially outer surface defining a finger-engaging area.

10. The dispenser of claim 1, wherein said open operating end has a radially outwardly extending rim, said flanged member has an externally threaded part received on said open end and retaining means received over said cylinder operatively engaging said rim are threadedly engaged with said externally threaded part, thereby to releasably retain said flange member on said operating end of said cylinder.

11. The dispenser of claim 7, wherein said open end of said cylinder receiving said externally threaded part has a radially outwardly extending rim and retaining means received over said cylinder operatively engaging said rim are threadedly engaged with said externally threaded part, thereby to releasably retain said flange member on said operating end of said cylinder.

12. The dispenser of claim 10, wherein said piston rod has a threaded outer surface and said second stop means is threadedly engaged with said surface thereby being rotatable on said piston rod to produce said adjustability along said rod.

13. The dispenser of claim 12, wherein said second stop means comprises a sleeve part received around said piston rod and extending toward said cylinder.

14. The dispenser of claim 10, wherein a lock nut is threadedly mounted on said piston rod and screwable into engagement with said second stop means, thereby to lock the latter in adjusted position on said rod.

15. The dispenser of claim 3, wherein the zero line of the indicia on said sleeve part is aligned with the zero line of the indicia on said flanged member when said sleeve part engages said flange.

16. The dispenser of claim 10, wherein the zero line of the indicia on said second stop means is aligned with the zero line of the indicia on said flanged member when said second stop means engages said flange.

17. The dispenser of claim 1, wherein a sealing ring is present in a circumferential recess on the outer surface of said piston.

* * * * *